May 20, 1924.
J. C. STEARNS
LAMP FOR WINDSHIELDS
Filed Oct. 12, 1923
1,494,821
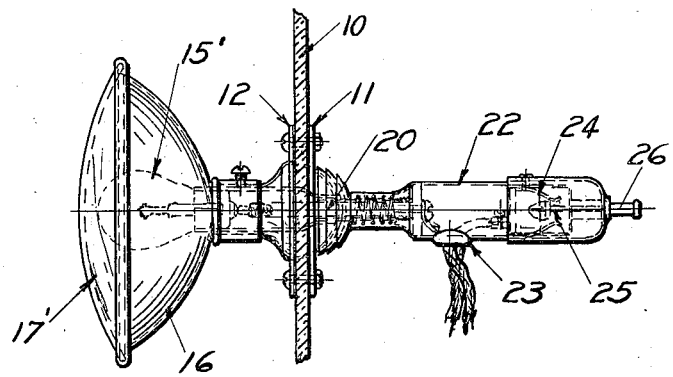
Fig 1
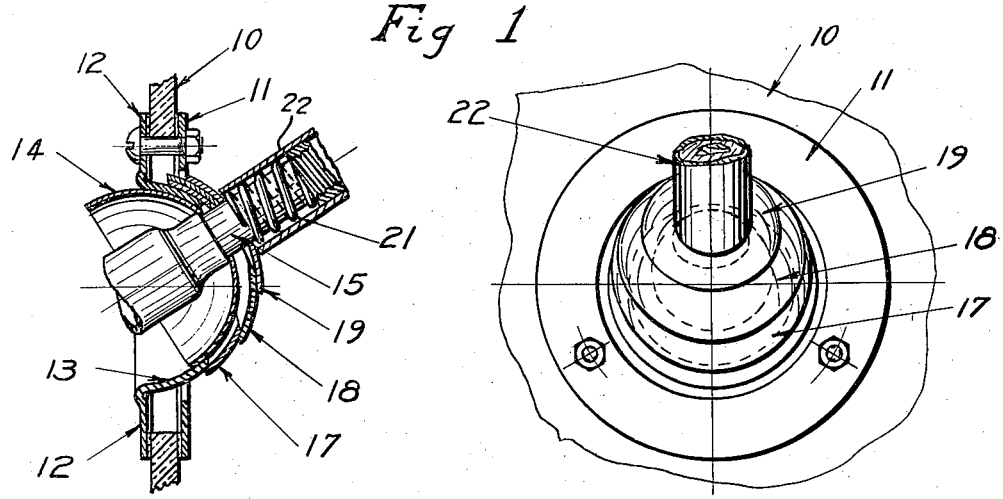
Fig 2
Fig 3
INVENTOR
JASON C. STEARNS
BY ATTORNEYS
Southgate Southgate Patented May 20, 1924.

UNITED STATES PATENT OFFICE.

JASON C. STEARNS, OF WORCESTER, MASSACHUSETTS.

LAMP FOR WINDSHIELDS.

Application filed October 12, 1923. Serial No. 668,111.

*To all whom it may concern:*

Be it known that I, JASON C. STEARNS, a citizen of the United States, residing at Worcester, in the county of Worcester and State of Massachusetts, have invented a new and useful Lamp for Windshields, of which the following is a specification.

This invention relates to a lamp adapted to be mounted on the wind shield of an automobile or, in fact, on any vertical or other wall in which the lamp is on one side of the wall or wind shield and the operating means therefor on the other side and it is desired to turn it on and off.

The principal objects of the invention are to provide a connecting and supporting means by which the lamp is mounted on the wind shield or other wall for permitting the rotary motion of the lamp to change the direction in which the rays are thrown and to arrange the mounting means in such a way that the opening through the wind shield will always be closed in all positions of the lamp and yet permit of the easy turning of the lamp and hold it by friction in any adjusted position.

The invention also involves features of construction in these mounting parts as will appear.

Reference is to be had to the accompanying drawings, in which

Fig. 1 is a side view of a dash lamp constructed in accordance with this invention showing it in position on the dash of an automobile;

Fig. 2 is a central sectional view of a part of the same on an enlarged scale showing the lamp tilted; and Fig. 3 is a rear view of the same with the lamp tilted to its extreme position.

In the construction herein shown, the glass wind shield 10, which of course may represent any wall of an automobile or even the stationary wall of a building, is provided with an opening therethrough and on one side is located a circular ring 11 surrounding the opening. On the opposite side is a similar ring 12 provided with a cup-shaped flange 13 extending inwardly all the way through the wall and projecting to the other side thereof. The inner surface of this flange is spherical in shape to form a seat and it is cut off in a plane to provide a circular opening through it so that the seat is of annular form. The parts so far described constitute all the stationary elements of this device, the two rings being secured together by screws or bolts extending through the wind shield.

Mounted within the flange 13 and capable of universal rotary motion therein is a hemispherical base 14 which is mounted on a shank 15 which extends through it and which is hollow and provides an opening through which the connecting member can pass to an electric lamp 15' on the end thereof mounted in the usual casing 16 and having a lens 17' completing the lamp structure. This base 14 fits within the flange 13 so as to be capable of swinging around to any position to direct the light up or down or sideways and this is made a perfect fit.

On the convex outside surface of the flange 13 is fitted a ring or washer 17 of sheet material, preferably brass, and having a spherical surface outside and in. The inner spherical surface fits the outside of the flange 13. This is an annular ring having a circular opening through it adapted to be engaged by the shank 15 to cause this ring 17 to turn on the surface of the flange 13.

In order to cover the central opening in the ring 17 I provide outside it another annular ring or washer 18 constructed in the same way except that the hole through the center is smaller. It fits the exterior of the ring 17 in all adjusted positions. I also prefer to add another ring 19 having spherical outer and inner surfaces fitting on the exterior of the ring 18 and having a central perforation just fitting the shank 15 so that it moves positively with it. The two rings 17 and 18 do not necessarily move positively with the shank at all times but are frictionally engaged with the ring 19 and the flange 13 respectively and move positively with the shank when it engages the edges of the openings through them due to the swinging motion.

The shank 15 extends through the central opening in the ring 19 to a considerable distance and is screw threaded on the outside. Inside the shank extends a conducting plunger 20 and outside it is a spring 21 pressing against the outer surface of the ring 19. This spring is mounted in the hollow end of the handle 22 and the conducting plunger is movably mounted in said handle. This handle is provided with an opening at 23 through which the cable for supplying the current is received and with a switch comprising springs 24, a plunger 25 and hand grip 26 for connecting and disconnecting the current. The end of the handle is screwed on the shank 15 and applies pressure through the spring 21 to the series of annular spherical rings on the rear side of the plate and to the base 14 to hold them yieldingly against opposite sides of the seat 13 so that wherever the lamp is turned it will be held in that position frictionally.

On account of this construction, the lamp can be turned to any desired position to throw the light in any direction and will be held frictionally in its adjusted position. At the same time the several washers 17, 18 and 19 completely close the opening behind the lamp base and exclude dust and dirt. The handle itself is located at a distance from the seat so that the lamp can be turned by it from the other side of the supporting wall or wind shield and can be manipulated in the ordinary way to turn the light off and on. It will be understood that these features can be placed anywhere desired and that the invention is of universal application to electric lamps.

Although I have illustrated and described only a single form of the invention I am aware of the fact that modifications can be made therein by any person skilled in the art without departing from the scope of the invention as expressed in the claims.

Therefore, I do not wish to be limited to all the details of construction herein shown and described but what I do claim is:

1. The combination with a perforated wall or the like having an annular spherical seat in the perforation, and a lamp carrying base having a spherical surface fitting in said seat for movably supporting the lamp, of means for yieldingly holding said base against the inner face of said seat, and a series of annular spherical washers of different sizes arranged on the opposite side of said seat, the inner one of said washers fitting the outside of said seat and the other washers fitting the outer face of the adjacent washer to seal the opening on that side, each washer being capable of limited motion in all directions about a common center while the inner adjacent washer remains stationary.

2. The combination with a lamp for the wind shield of an automobile, of a support therefor comprising an annular spherical seat flange extending through the wind shield and open on both sides, a hemispherical base carrying said lamp fitting in said seat and universally adjustable therein, a series of annular spherical washers fitting each other and the largest fitting the outside surface of said flange to close the space on that side, and means for holding said washers in contact with each other and with the flange and the joint member against the seat.

3. A lamp support comprising a convex base for carrying the lamp, an annular concave seat having a convex rear surface, an annular washer of thin material fitting on the convex surface of said seat and having a central opening, a second washer of similar shape fitting the exterior of the first washer and having a smaller opening therethrough, both washers and the base being tiltable on the seat, and means for holding said parts against the outer and inner surfaces of the seat, comprising a shank passing into said base through said openings.

4. A lamp support comprising a convex base for carrying the lamp, an annular concave seat having a convex rear surface, an annular washer fitting on the convex surface of said seat, a second washer of similar shape fitting the exterior of the first washer, both washers and the base being tiltable on the seat, and means for holding said parts against the outer and inner surfaces of the seat, comprising a handle by which the lamp can be turned in the seat.

In testimony whereof I have hereunto affixed my signature.

JASON C. STEARNS.